United States Patent [19]

Kobayashi

[11] Patent Number: 4,471,365
[45] Date of Patent: Sep. 11, 1984

[54] RECORDING APPARATUS
[75] Inventor: Keigo Kobayashi, Ibaraki, Japan
[73] Assignee: Mitogiken, Ltd., Ibaraki, Japan
[21] Appl. No.: 463,983
[22] Filed: Feb. 4, 1983
[30] Foreign Application Priority Data Feb. 5, 1982 [JP] Japan .................................. 57-17960

[51] Int. Cl.³ ............................................ G01D 15/04
[52] U.S. Cl. .................................................. 346/78
[58] Field of Search ...................... 346/78, 79, 93, 141

[56] References Cited

U.S. PATENT DOCUMENTS

| 3,386,378 | 4/1967 | Bradbury et al. | 346/78 |
| 3,531,633 | 9/1970 | Johnson | 346/78 |
| 3,587,112 | 6/1971 | Hill | 346/79 |
| 3,641,582 | 2/1972 | Theodoridis | 346/80 |
| 3,883,878 | 5/1975 | Bommer | 346/79 |
| 3,949,402 | 4/1976 | Kelley et al. | 346/79 |
| 4,160,255 | 7/1979 | Kobayashi | 346/79 |

Primary Examiner—J. V. Truhe
Assistant Examiner—Art Evans
Attorney, Agent, or Firm—Beall Law Offices

[57] ABSTRACT

Herein disclosed is a battery-operated, dot type recording apparatus which comprises a drive mechanism unit having its number of revolutions regulated by the output of a quartz oscillator, a circuit for connecting a d.c. power source with a meter only when a measured value is to be recorded, and delay switching means for causing the tip of a pointer of a meter to hit the recording paper at the time when that meter becomes stable. Thus, the dot type recording apparatus is so constructed of a small number of mechanical means that it can reliably operate for a long time, while having its adjustment and maintenance facilitated, with little influence from changes in circumstances.

11 Claims, 15 Drawing Figures

FIG. 3
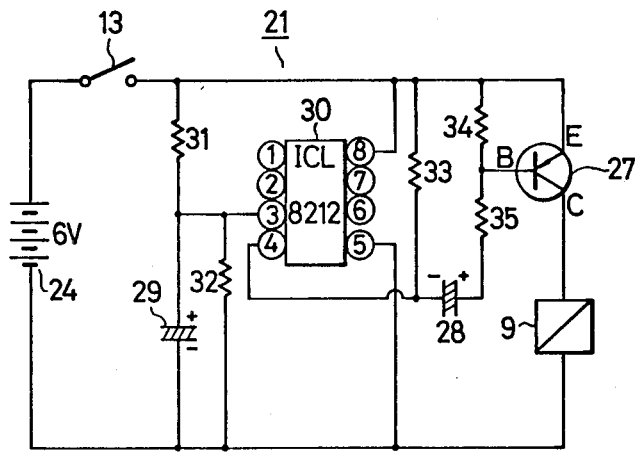
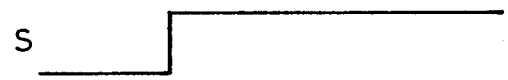
FIG. 4
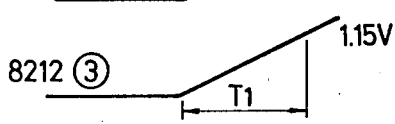
FIG. 5
FIG. 6
FIG. 7
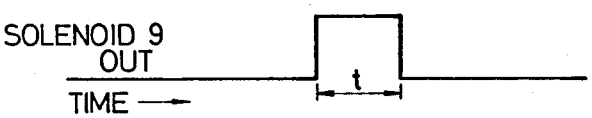
FIG. 8

FIG. 14   TRANSISTOR 27
          Ic

FIG. 15   CONTACT OF RELAY 38
          OFF
                              t
          TIME →

RECORDING APPARATUS

BACKGROUND OF THE INVENTION

1. Field of the Invention

The present invention relates to an improvement in a small-sized recording apparatus which is enabled to operate for a long period by using dry cells or the like as its power source.

2. Description of the Prior Art

A recording apparatus used generally in the prior art is connected with commercial power source lines. It is, therefore, customary to use a solar cell as the power source when it is intended to automatically record for a long period the temperatures or the like of mountainous places out of the way, where such commercial power sources are not available. However, high cost is required for the facilities of the solar cells, and still the worse there is no way but to uses the dry cells or the like when it is intended to record the temperatures of under-water or -ground places where no solar ray reaches. In this application, all the powers depend upon the dry cells so that the recording apparatus cannot stand prolonged use.

In order to solve these problems, I, the inventor, have disclosed in the U.S. Pat. No. 4,160,255 a battery-operated, dot type recording apparatus which is so constructed that the recording paper feed and the recording operation are alternately executed in short times and that a measuring instrument is actuated only during a period of time covering time intervals before and after each recording operation, the actuation of the measuring instrument and the recording paper feed as well as the recording operation being carried out at good timing in a short period of time, whereby the consumption of the battery is low, no high power is required at a time, and the recovery time of the battery suffices, so that the battery is of long life. Thanks to the aforementioned constructins, the dot type recording apparatus has a result that it can carry out the automatic recording operations for a time period longer than three months by the use of four 1-U size dry cells and is practised in wide applications.

In addition, I have disclosed in the Japanese Utility Model No. 1,440,595 (i.e., the Japanese Utility Model Publications No. 46,164/1981) a recording apparatus which has a power source, in which a pointer of a meter operated by the power source is caused to hit pressure-sensitive recording paper thereby to record dots and in which aid pressure-sensitive recording paper is intermittently fed during the time period other than that for the dot type recording operation, said recording apparatus being chracterized in that said dot type recording operation and said recording paper feeding operation are conducted by means adapted to be regulated by an electric oscillator. The apparatus thus disclosed is enabled to switch the dot type recording operation and the recording paper feeding operation without any use of a clock mechanism.

In the recording apparatus disclosed in the above, however, it is the present practice that a precise and complex drive mechanism is used for operating the measuring instrument and a recording mechanism. This raises a problem that the operating accuracy is degraded in petroleum-producing tropical countries where the temperature change is drastic. Moreover, it takes a long time to adjust and maintain the delicate drive mechanism.

SUMMARY OF THE INVENTION

The present invention has been conceived partly to eliminate the aforementioned defects and partly to improve a small-sized recording apparatus which has a low power consumption required so that it can be operated for a long time period by dry cells, for example, without being replenished with its power source for a long period.

A major object of the present invention is to provide a small-sized recording apparatus which can be reliably operated for a long period while reducing the number of mechanical means to as small as possible.

Another object of the present invention is to provide a small-sized recording apparatus which is hardly influenced by the changes in circumstances.

Still another object of the present invention is to provide a small-sized recording apparatus which has its adjustment and maintenance simplified.

The present invention has been conceived so as to achieve the above-identified objects and is mainly featured by providing a dot type recording apparatus which has a power source, and dotting means and recording paper feed means, both being operated by said power source, and in which recording is executed by said dotting means causing a pointer of a meter operated by a measuring instrument to hit the recording paper, wherein the improvement comprises: a d.c. power source; an amplifier connected as a pre-amplifier with a meter, which has a pointer for indicating a measured value, for amplifying a measurement signal; a drive mechanism unit having its number of revolutions regulated by the output of a quartz oscillator; a dot type recording paper feed drum made operative when the revolutions of one output shaft of said drive mechanism unit is transmitted thereto; delay switching means connected in parallel with said amplifier for generating an output when a predetermined time period elapses after it is energized; a solenoid adapted to be energized by the output of said delay switching means for moving down the dotting frame of said dotting means thereby to forcibly cause the tip of said pointer to hit said recording paper; and a switch adapted to be actuated by the revolutions of the other output shaft of said drive mechanism unit for applying the power of said d.c. power source to said amplifier and said delay switching means at a predetermined time interval.

In other words, the recording apparatus according to the present invention is so constructed that, when the meter is operated at the predetermined time interval to execute the dot type recording operation, the solenoid operated to move down the dotting frame, at the time when the operation of the meter is stabilized, thereby to cause the tip of the pointer to hit the dot type recording paper. By this construction, the present invention is enabled to achieve the desired objects.

BRIEF DESCRIPTION OF THE DRAWINGS

The present invention will be understood in view of the following detailed description made with reference to the accompanying drawings, in which:

FIG. 3 is a diagram showing a delay switching circuit of FIG. 2;

FIGS. 4 to 8 are time charts illustrating the operations of the delay switching circuit of FIG. 3;

FIGS. 11 to 15 are time charts illustrating the operations of the delay switching circuit of FIG. 10.

DESCRIPTION OF THE PREFERRED EMBODIMENTS

Figure 1:
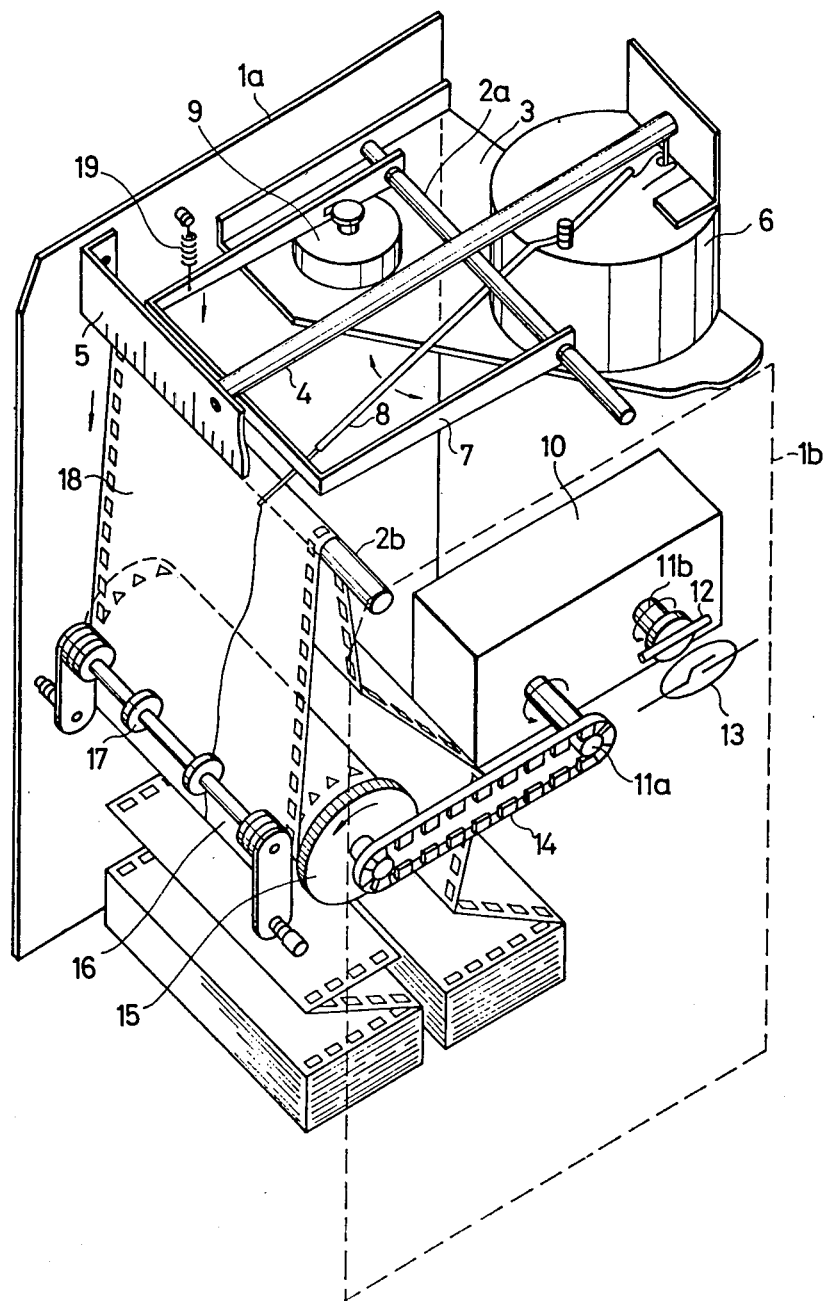
FIG. 1 is a perspective view showing a recording apparatus according to one embodiment of the present invention.

FIG. 1 is a partially cut-away view showing a dot type small-sized recording apparatus, which employs pressure-sensitive recording paper of folding type, as an embodiment of the present invention.

In FIG. 1 showing the internal construction of the recording apparatus with its top cover and its righthand side cover 1b being removed, another side cover 1a and the side cover 1b indicated by broken lines are assembled into an integrated structure by means of cross bars 2a and 2b and a cross plate 3. A scale plate 5 is attached to an upper portion of the front side of the integral structure. Above a meter 6 placed on the cross plate 3, there is disposed a zero adjusting arm 4 of a pointer 8, below which is disposed a dotting frame 7 hinged to the cross bar 2a. Below the dotting frame 7, there extends the pointer 8 which is hinged to the meter 6 and to the tip of which is fixed a nylon wire.

With the dotting frame, moreover, there is engaged an upper portion of a moving member of a solenoid 9, which member is moved down, when the solenoid 9 is energized, so that the nylon wire of the pointer 8 is caused by the dotting frame 7 to hit dot type recording paper of folding type 18 lying on the cross bar 2b. In other words, the pointer 8 is so constructed as to record a measured value in dots upon the dot type recording paper 18 of folding type, which is moving the cross bar 2b while being wound.

Below the cross plate 3, there is disposed a drive mechanism unit 10 which has a quartz oscillator, an oscillation frequency divider, a pulse motor and a gear train built therein and from which two output shafts 11a and 11b are made to protrude. As this drive mechanism unit 10, there is used a unit which is as small-sized as an analog quartz clock, for example. As a result, the drive mechanism unit 10 can enjoy better time precision, be less influenced by the temperature change and be more freed from any adjustment than the mechanical clock unit of the prior art.

The output shaft 11a causes a timing belt 14 to run, through a pulley fixed to its leading end, and the other end of the timing belt 14 in turn causes the shaft of a feed drum 15 to revolve, through a pulley. The output shaft 11a, thus coupled, always revolves to effect turns of the feed drum 15, once for six hours, thereby to feed the dot type recording paper 18 of folding type at a speed of 10 mm/h. Since the torque of that output shaft 11a is enlarged at a magnification of 21,600 times, moreover, the dot type recording paper 18 is fed without fail so that it can continuously record the data of 100 days or more even if it a usual length.

The other output shaft 11b revolves once for four minutes and supports a rod-shaped magnet 12 at its leading end. Since a lead switch 13 is disposed in the vicinity of the magnet 12, moreover, it is turned on once for a half revolution of the output shaft 11b, i.e., once for two minutes thereby to operate a measurement indicating circuit and a dot type recording circuit. Incidentally, reference numeral 16 indicates a pressure mechanism for pressing the dot type recording paper 18 onto the feed drum 15 by means of rollers 17, and numeral 19 indicates a tension spring for pulling up the dotting frame 7.

Figure 2:
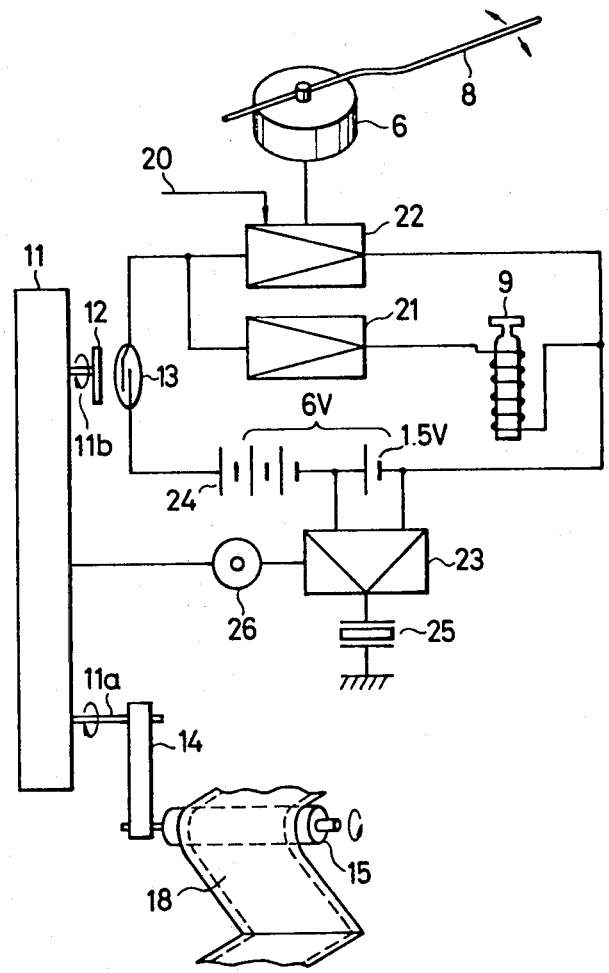
FIG. 2 is a block diagram showing the recording apparatus of FIG. 1.

FIG. 2 is a block diagram showing the recording apparatus of FIG. 1. A quartz oscillator 25 is connected through an oscillation frequency divider 23 with a power source of dry cells of 1.5 V so that its output has its frequency divided to operate a pulse motor 26. This pulse motor 26 revolves the output shaft 11a at a low speed at all times through the drive gear unit 11 thereby to feed the recording paper through the timing belt 14 and the feed drum 15. The magnet 12 of the other output shaft 11b periodically turns on the lead switch 13 thereby to operate the dry cell power source 24 of 6 V, the measuring circuit and the dotting circuit.

Included in the measuring circuit is an amplifier 22 which is made operative to amplify an input 20, i.e., data to be recorded and to indicate it in the meter 6. In other words, the input 20 is indicated by the pointer 8 and is recorded in a dotted form on the folding type recording paper 18. This dotting operation is executed by the dotting circuit which is equipped with both a delay switching circuit 21 connected in parallel with the amplifier 22 and the solenoid 9 connected with the output terminal of the delay switching circuit 21. The moving member of the solenoid 9 is connected to the dotting frame 7, and the delay switching circuit 21 operates the solenoid 9 several second after the lead switch 13 has been turned on. In other words, the moving member of the solenoid 9 is attracted to effect the recording operation in the dotted form at the time when the indication by the pointer 8 of the meter 6 becomes stable.

FIG. 3 is a diagram which shows the delay switching circuit of FIG. 2 and in which the same parts as those of FIG. 2 are indicated at the same reference characters. For example, a voltage detector 30, which may be the ICL8212 of INTERSIL Co., Ltd. of U.S.A., is a micropower bipolar monolithic integrated circuit which is mainly intended to conduct precise voltage detection. This IC is composed of a precise reference voltage circuit, a comparator, a pair of output buffers and a driver and is made operative to generate its output when its internal reference voltage, i.e., its threshold terminal voltage drops to a level lower than 1.15 V. More specifically, switching characteristics which are strong against positive noises are obtained by making a simple feedback at the hystereisis terminal, and the solenoid 9 is operated by operating a transistor 27 with the output of that IC to establish a high output current.

FIGS. 4 to 8 are time charts illustrating the operations of the delay switching circuit of FIG. 3. The voltage to be applied when the lead switch 13 is turned on its illustrated in FIG. 4. Moreover, the input voltage to the terminal (3) of the voltage detector 30 is illustrated in FIG. 5, whereas the voltage at the terminal (4) is illustrated in FIG. 6. More specifically, when the voltage at the terminal (3) is made to reach the internal reference voltage of 1.15 V by a time constant $T_1$ which is determined by the coaction of a capacitor 29 and a resistor 31 of FIG. 3, the output from the terminal (4) is dropped to zero. On the other hand, the internal reference voltage is set by the resistors 31 and 32.

FIG. 7 illustrates the output of the transistor 27 whereas FIG. 8 illustrates the operating state of the solenoid 9. When the output from the terminal (4) of the voltage detector 30 is dropped to zero as in the above, the transistor 27 generates its output to energize the solenoid 9. When the output of the transistor 27 is gradually dropped to a certain voltage level, on the contrary, the solenoid 9 is left deenergized. On the other hand, the dotting operation by the solenoid 9 is conducted for about 0.5 seconds. This dotting time period t is determined by the values of resistors 33, 34 and 35 and a capacitor 28.

In the recording apparatus of the present embodiment, the quartz oscillator 25 is energized by the dry cells of the power source 24 to have its output signal frequency divided, and the pulse motor 26 is run to have its driving power transmitted to the gear train of the drive gear unit 11 thereby to revolve the two output shafts 11a and 11b. Of these, one output shaft 11a always revolves the feed drum at a low speed, and the other output shaft 11b periodically turns on the lead switch 13 by means of the rod-shaped magnet 12 which is fixed to the end face thereof. As a result, the dry cell power source 24 of 6 V and the measurement indicating circuit are connected so that the measured input 20 is amplified and then indicated by means of the pointer 8 of the meter 6. At the same time, the solenoid 9 is operated with a delay by the delay switching circuit 21 so that the recording operation is conducted in the dotted form at the time when the indication of the pointer 8 is stabilized. The electric circuit for executing the aforementioned operations is hardly influenced by the changes in the circumstances such as the temperatures but can precisely operate for a long time period. There can be attained another effect that the drive mechanism unit and so on can be easily maintained without any adjustment because it is assembled and sealed in the small casing.

On the other hand, the measurement indicating circuit and the dot type recording circuit are operated by the closing of the lead switch, which takes place once for each two minutes. However, the operating time or time period of lead switch 13 remains closed is about 15 seconds, for which the current to flow through the measurement indicating circuit is about 3 mA, and the operating current for the solenoid of the dot type recording circuit is about 40 mA but continues for as short as 0.5 seconds or less. As a result, the power of the battery is consumed at a small rate for a short time period, and the battery itself is left in its rest state for most of the remaining intermediate periods. According to the characteristics of the dry cell, the life of the battery can be far elongated in case the rest time is far longer than the operating time. These characteristics are skillfully used in the apparatus of the present invention.

The embodiment thus far described is directed to the example which employs the dot type recording paper 18 of folding type and which can enjoy and advantage that the recorded data can be conveniently inspected in a retroactive manner. Despite this fact, the present invention should not be limited to that embodiment but can employ rolled dot type recording paper.

Figure 9:
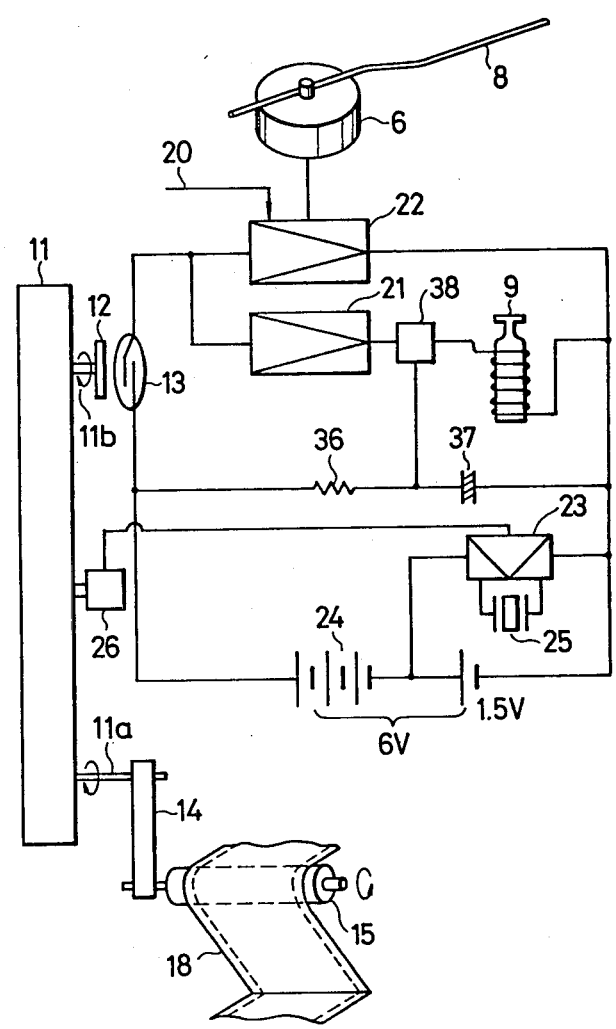
FIG. 9 is a block diagram showing a recording apparatus according to another embodiment of the present invention.
Figure 10:
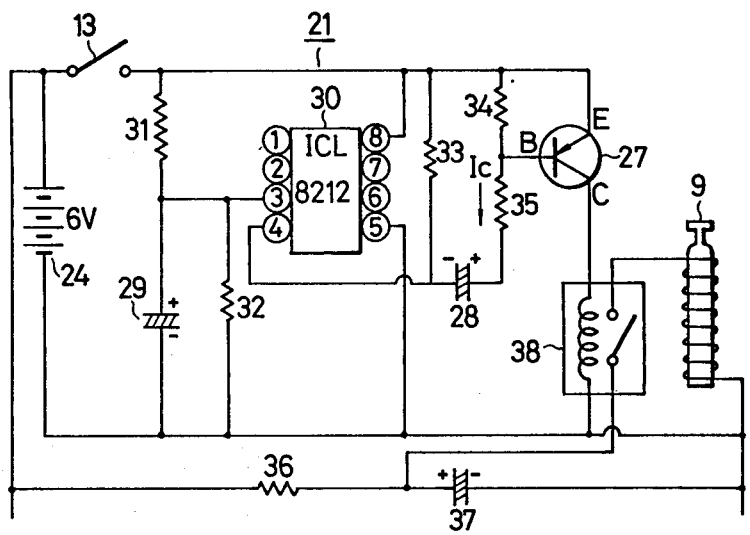
FIG. 10 is a diagram showing a delay switching circuit of FIG. 9.
Figure 10:
Figure 10:
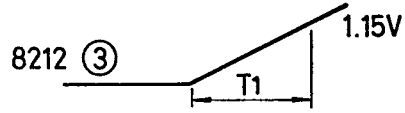
Figure 10:
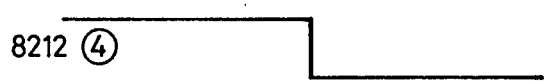
Figure 10:
Figure 10:
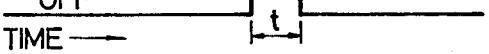

In FIGS. 9 and 10 showing another embodiment, the same parts as those of FIGS. 2 and 3 are indicated at the same reference characters. in this second embodiment, a relay 38 is connected between the delay switching circuit 21 and the solenoid 9, and a line composed of a resistor 36 and a capacitor 37 is connected between both the terminals of the d.c. power source 24 of 6 V. The relay 38 has its moving contact connected between the resistor 36 and the capacitor 37.

In the delay switching circuit 21 shown in FIG. 10, the relay 38 is equipped with a coil, which is connected between the collector of the transistor 27 and the earth, and a moving contact which is disposed in the vicinity of that coil. Thus, the moving contact is connected between the resistor 36 and the positive terminal of the capacitor 37, and the resistor 36 itself has a high resistance. As a result, the capacitor 37 is gradually charged up. When the lead switch 13 is turned once each two minutes, the relay 38 has its moving contact attracted by the coil so that it is turned on, and the voltage built up in the capacitor 37 is abruptly released through the solenoid so that the moving contact is pulled down to instantly effect the recording operation in the dotted form.

After the discharge, a small current again flows through the resistor 36 to start the charging operation of the capacitor 37. This capacitor 37 is gradually charged up for about 20 seconds. However, since the maximum charging current at that time is about 2 mA, no influence is exerted upon the battery cell power source of 1.5 V for the quartz oscillator so that this quartz oscillator 25 can continue its stable operation. Moreover, even if the delay switching circuit 21 operates so that a large current temporarily flows through the solenoid 9, the stored voltage of the capacitor 37 is merely discharged so that the operation of the quartz oscillator 25 is not influenced.

FIGS. 11 to 15 are time charts which illustrate the operations of the delay switching circuit of FIG. 10 and of which FIGS. 11 to 14 are similar to FIGS. 4 to 7. As illustrated in FIG. 12, specifically, when the voltage at the terminal (3) reaches the internal reference voltage of 1.15 V, the conduction between the terminals (4) and (5) is established in the voltage detector 30 so that a current Ic flows through the resistors 34 and 35 to abruptly charge up the capacitor 28. As a result, the transistor 27 operates to allow the current to flow therethrough. FIG. 14 illustrates the current to flow through the transistor 27 whereas FIG. 15 illustrates the state of the contacts of the relay 38.

When the output from the terminal (4) of the voltage detector 30 is dropped to zero as in the above, the transistor 27 generates its output to render the relay 38 conductive. When the output of the transistor 27 is dropped, on the contrary, the relay 38 has its contacts opened. Incidentally, the dotting operation by the solenoid 9 is executed for about 0.5 seconds, which are equal to the time period having the contacts of the relay 38 connected. However, this time period is determined similarly to the case of FIG. 3 by the values of the resistors 33, 34 and 35 and by the capacitor 28.

In the recording apparatus of this second embodiment, there is connected between the delay switching circuit 21 and the solenoid 9 the relay 38 having the coil, through which the collector of the transistor 27 is grounded to the earth so that the moving contact of the relay 38 is connected between the high resistor 36 and the capacitor 37 of the line, which is in a state to allow the power source current to flow at all times, thereby to operate the solenoid 9 for the dotting operation. The recording apparatus can enjoy an effect that it can operate highly precisely for a long time period even during that dotting operation while preventing the power source of the quartz oscillator 25 from being influenced.

What is claimed is:

1. A dot type recording apparatus, which has a power source, and dotting means and recording paper feed means, both being operated by said power source, and in which recording is executed by said dotting means causing a pointer of a meter, opeated by a measuring instrument that produces a measurement signal, to hit the recording paper,
wherein the improvement comprises:
said power source being a D.C. power source;
amplifier means powered by said power source and connected as a pre-amplifier with said meter for amplifying the measurement signal;
an oscillator powered by said power source;
said recording paper feed means including a dot type recording paper feed drum and drive means powered by said oscillator for rotating said drum and moving the paper past said pointer;
switch means periodically closing for a fixed interval in response to rotation of said drum by said drive means for providing from said D.C. power source to said amplifier only when closed;
delay switching means connected in parallel with said amplifier to receive power from said power source only when said switchmeans is closed and for generating an output when a fixed time period elapses after it is energized from said power source through said switch means;
solenoid means connected to be energized by the output of said delay switching means for moving said pointer of said meter to hit the recording paper when energized; and
said delay switching means thereby permitting said amplifier and meter to stabilize prior to recording, and said switch means being closed for only a small period of time during operation of said oscillator means for conserving the energy of said power source.

2. A dot type recording apparatus as set forth in claim 1, wherein said oscillator means is a quartz oscillator.

3. A dot type recording apparatus as set forth in claim 2, wherein said drive means includes two output shafts, one of said shafts being drivingly connected to said feed drum, and the other of said shafts having means thereon for actuating said switch means.

4. A dot type recording apparatus as set forth in claim 2, further including relay means connected with the output of said delay switching means to be energized thereby and connected in circuit with said solenoid for energizing said solenoid when energized.

5. A dot type recording apparatus as set forth in claim 4, wherein said relay means has a primary circuit connected together with said delay switching means in parallel with said power source and said quartz oscillator, and a secondary circuit connected in series with said solenoid and a capacitor, and wherein said capacitor is connected to said power source in parallel with said quartz oscillator so that the output of said switching means will close said relay and pass the charge of said capacitor through said relay to energize said solenoid.

6. A dot type recording apparatus as set forth in claim 2: wherein said drive means includes an oscillation frequency divider for dividing the frequency of the output of said quartz oscillator, a pulse motor operated by the output of said oscillation frequency divider, and a timing belt connected to said motor and said dot type recording paper feed drum so that said drum is revolved at a low speed; and wherein said switch means includes a rod-shaped magnet rotated by said motor and a lead switch disposed in the vicinity of said magnet.

7. A dot type recording apparatus as set forth in claim 3: wherein said drive means includes an oscillation frequency divider for dividing the frequency of the output of said quarts oscillator, a pulse motor operated by the output of said oscillation frequency divider, and a timing belt connected to said motor and said dot type recording paper feed drum so that said drum is revolved at a low speed; and wherein said switch means includes a rod-shaped magnet rotated by said motor and a lead switch disposed in the vicinity of said magnet.

8. A dot type recording apparatus as set forth in claim 4: wherein said drive means includes an oscillation frequency of the output of said quartz oscillator, a pulse motor operated by the output of said oscillation frequency divider, and a timing belt connected to said motor and said dot type recording paper feed drum so that said drum is revolved at a low speed; and wherein said switch means includes a rod-shaped magnet rotated by said motor and a lead switch disposed in the vicinity of said magnet.

9. A dot type recording apparatus as set forth in claim 5: wherein said drive means includes an oscillation frequency divider for dividing the frequency of the output of said quartz oscillator, a pulse motor operated by the output of said oscillation frequency divider, and a timing belt connected to said motor and said dot type recording paper feed drum so that said drum is revolved at a low speed; and wherein said switch means includes a rod-shaped magnet rotated by said motor and a lead switch disposed in the vicinity of said magnet.

10. A dot type recording apparatus as set forth in claim 2, wherein said amplifier, said delay switching means and said solenoid are connected in parallel with the power source including that of said quartz oscillator.

11. A dot type recording apparatus as set forth in claim 1: wherein said drive means includes an oscillation frequency divider for dividing the frequency of the output of said oscillator, a pulse motor operated by the output of said oscillation frequency divider, and a timing belt connected to said motor and said dot type recording paper feed drum so that said drum is revolved at a low speed; and wherein said switch means includes a rod-shaped magnet rotated by said motor, and a lead switch disposed in the vicinity of said magnet.

* * * * *